United States Patent
Ung et al.

(10) Patent No.: US 8,130,081 B2
(45) Date of Patent: Mar. 6, 2012

(54) DATA MANAGEMENT FOR INTERMITTENTLY CONNECTED SENSORS

(75) Inventors: Kevin Yong Ung, Bellevue, WA (US); Richard Neil Blair, Kent, WA (US); Arun Ayyagari, Seattle, WA (US); Craig Farris Battles, Seattle, WA (US); Thanh Duc Hoang, Edgewood, WA (US); Brian James Smith, Seattle, WA (US); William P. Coop, Buckley, WA (US); Marc Rollo Matsen, Seattle, WA (US)

(73) Assignee: The Boeing Company, Chicago, IL (US)

( * ) Notice: Subject to any disclaimer, the term of this patent is extended or adjusted under 35 U.S.C. 154(b) by 882 days.

(21) Appl. No.: 12/035,110

(22) Filed: Feb. 21, 2008

(65) Prior Publication Data

US 2009/0212914 A1    Aug. 27, 2009

(51) Int. Cl.
    *H04Q 5/22* (2006.01)
(52) U.S. Cl. .................. 340/10.41; 340/10.4; 340/10.1; 340/10.5; 340/10.51
(58) Field of Classification Search ...... 340/10.1–10.52, 340/572.1; 370/352; 348/441, 445; 235/385
    See application file for complete search history.

(56) References Cited

U.S. PATENT DOCUMENTS

| | | | | |
|---|---|---|---|---|
| 6,988,204 | B2 * | 1/2006 | Alve et al. | 713/193 |
| 6,999,127 | B2 * | 2/2006 | Ryoo et al. | 348/441 |
| 7,520,424 | B2 * | 4/2009 | Haberler | 235/380 |
| 2004/0264441 | A1 | 12/2004 | Jalkanen et al. | |
| 2007/0114280 | A1 | 5/2007 | Coop et al. | |
| 2007/0290803 | A1 | 12/2007 | Ayyagari | |
| 2009/0033493 | A1 * | 2/2009 | Lin et al. | 340/572.1 |

OTHER PUBLICATIONS

U.S. Appl. No. 11/553,575, filed Oct. 27, 2006, Ayyagari.

* cited by examiner

*Primary Examiner* — Benjamin C Lee
*Assistant Examiner* — Peter Mehravari
(74) *Attorney, Agent, or Firm* — Yee & Associates, P.C.

(57) ABSTRACT

A computer implemented method, apparatus, and computer usable program code for managing data on an intermittently connected sensor. A data management system manages the data on radio frequency identification tags. The data management system comprises a radio frequency identification tag capable of storing the data, program code stored on the radio frequency identification tag, and a reader data processing system. The reader data processing system is capable of receiving the data and the program code from the radio frequency identification tag in a radio frequency signal and capable of executing the program code to read the data.

19 Claims, 9 Drawing Sheets

DATA MANAGEMENT FOR INTERMITTENTLY CONNECTED SENSORS

BACKGROUND INFORMATION

1. Field

The present disclosure relates generally to data management and in particular to a method and apparatus for storing data in an intermittently connected sensor. Still more particularly, the present disclosure relates to a method, apparatus, and computer program code for accessing data about items in intermittently connected sensors associated with the items.

2. Background

Intermittently connected sensors, such as radio frequency identification (RFID) tags, may be used to store and retrieve data. A radio frequency identification tag is an example of a remote intermittently connected sensor that may be associated with an item. In these examples, associating a radio frequency identification tag with an item may include, for example, attaching the radio frequency identification tag to the item, incorporating the radio frequency identification tag into the item, or some other suitable mechanism for placing a radio frequency identification tag proximate to the item such that the tag can be readily identified as being associated with the item. These items include, for example, products, animals, or people. These types of sensors may be used to identify items and obtain information about items using radio frequency transmissions. Some radio frequency identification tags may be read from several meters away and beyond the line of sight of the reader.

These types of sensors are used in enterprise supply chain and management. The use of intermittently connected sensors improves the efficiency of tracking and managing inventory. For the various uses of these types of sensors, it is important to ensure that the data is consistently and properly stored and retrieved from radio frequency identification tags, as well as ensure that the data is trustworthy. These capabilities are especially important with airline parts, original equipment manufacturer (OEM), and airline maintenance operations of an aircraft part that is associated with a radio frequency identification tag.

With this type of use, more storage is required as compared to radio frequency identification tags used with other items, such as, for example, consumer products. The aircraft industry has indicated that it would be desirable to use radio frequency identification tags as a storage device for information such as, for example, maintenance history records, maintenance instructions, and other suitable information associated with the aircraft component.

In tracking aircraft parts, the radio frequency identification tag is a storage device on which different radio frequency identification tag readers may read and place data about an aircraft part onto the radio frequency identification tag associated with the item. As the radio frequency identification tag and the aircraft part moves from city to city, or move from airline to airline, properly reading the data on the tag is important.

Therefore, it would be advantageous to have a method, apparatus, and computer program code for overcoming the problems described above.

SUMMARY

The advantageous embodiments provide a computer implemented method, apparatus, and computer usable program code for managing data on an intermittently connected sensor. In one advantageous embodiment, a data management system manages the data on radio frequency identification tags. The data management system comprises a radio frequency identification tag capable of storing the data, program code stored on the radio frequency identification tag, and a reader data processing system. The reader data processing system is capable of receiving the data and the program code from the radio frequency identification tag in a radio frequency signal and capable of executing the program code to read the data.

In another advantageous embodiment, an apparatus comprises a housing, an antenna located within the housing, a memory located within the housing, and a logic control circuit located within the housing. The memory stores data and data management instructions, wherein the data management instructions are capable of being executed on a data processing system to read the data. The logic control circuit is capable of causing the antenna to emit a response signal containing the data management instructions in response to detecting a signal.

In still another advantageous embodiment, a computer implemented method is present for managing data on an intermittently connected sensor. The data and data management instructions are received from the intermittently connected sensor at a data processing system. The data management instructions are executed on the data processing system to read the data.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
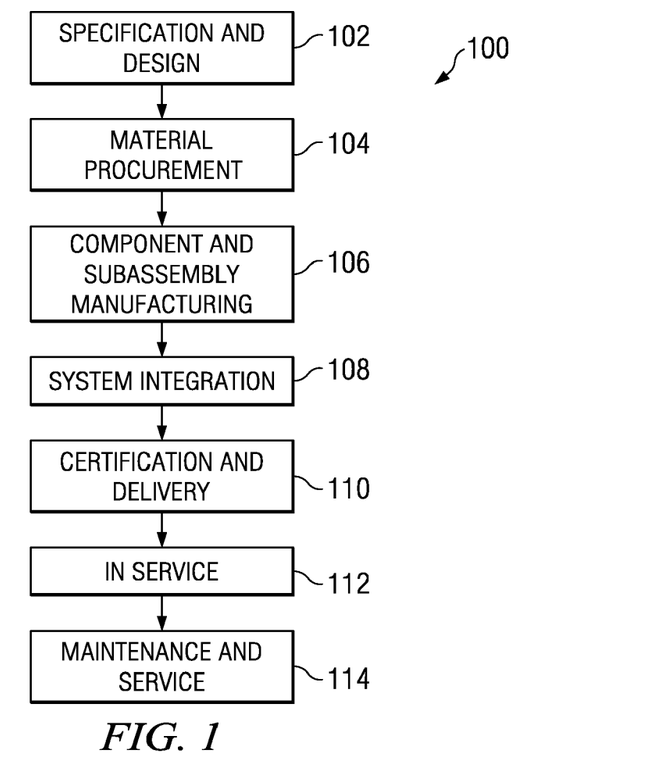
FIG. 1 is a diagram illustrating an aircraft manufacturing and service method in accordance with an advantageous embodiment.
Figure 2:
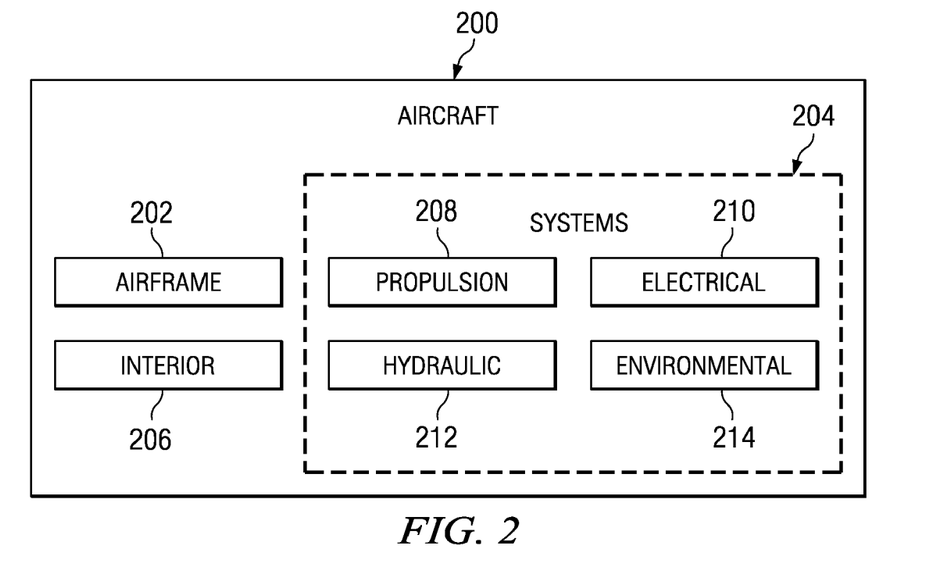
FIG. 2 is a diagram of an aircraft in which an advantageous embodiment may be implemented.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104. During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1. Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200.

Similarly, one or more of apparatus embodiments, method embodiments, or a combination thereof may be utilized while aircraft 200 is in service 112 or during maintenance and service 114 in FIG. 1. For example, data management of intermittently connected sensors, such as radio frequency identification tags, may be provided during various stages including, for example, component and subassembly manufacturing 106, system integration 108, and maintenance and service 114 in FIG. 1.

In the different advantageous embodiments, the radio frequency identification tags are associated with items in the form of aircraft parts. Radio frequency identification tags may be associated with aircraft parts during the manufacturing of those parts, such as during component and sub-assembly manufacturing 106 in FIG. 1.

Further, radio frequency identification tags may be associated with parts during system integration 108 or other stages. The use of data stored in the radio frequency identification tags may occur during these stages and during stages, such as in component and subassembly manufacturing 106 or maintenance and service 114 in FIG. 1.

The data stored in these tags may vary, depending on the particular implementation. For example, data, such as identification of parts, manufacturers of the parts, maintenance schedules, maintenance histories, and other suitable information, may be stored on radio frequency identification tags in association with aircraft parts. These parts may take various forms, such as, for example, a landing gear system, a chair, an in-flight entertainment system, a line replaceable unit, system component, an engine, or some other aircraft part. As a result, an aircraft may have hundreds of thousands of radio frequency identification tags.

The different advantageous embodiments recognize that properly reading data from a radio frequency identification tag relies on the radio frequency identification reader knowing how to interpret the data stored on the radio frequency identification tag. For example, the first M bytes of data may identify the object while the succeeding N bytes of data identify a creation date. Unless the location of those two types of data is known, a reader is unable to read and present this information. The reader is able receive the data, but not "read" the data.

Further, the creation date may be in a particular format, such as day month year, or month day year hour and seconds. Unless this type of format also is known, the data in the tag may not be read. These formats in this type of data and the location of data may change, depending on the particular implementation. As a result, the different entities that may read the information from the tag have to agree on a format for storing and reading the data.

The different advantageous embodiments recognize, however, that this type of solution may be difficult to implement when aircraft parts may be moved or travel over large geographic areas between multiple entities. Additionally, if changes occur in formats for the data, these changes may be difficult to quickly implement because each reader requires new software or new versions of software to read the new formats.

Additionally, the different advantageous embodiments recognize that as formats change or are updated, one radio frequency identification tag may have a different format from another radio frequency identification tag. As a result, an aircraft may have radio frequency identification tags using different formats. The different advantageous embodiments also recognize that this situation requires a reader to have the software needed to read the different formats and an ability to identify which format requires which software. This situation may require a reader to have multiple programs, applications, configuration files, and/or other computer program code needed to read the different formats. Further, software is required to identify what format is present for a particular tag.

Thus, the different advantageous embodiments provide a computer implemented method, apparatus, and computer usable program code for managing data in intermittently connected sensors, such as radio frequency identification tags. In the different advantageous embodiments, a radio frequency identification tag contains data and computer program code needed to properly read data.

In these examples, the data is read when the processor program code can process and/or use the data. The data may be considered processed if the program code can process the data using the formats the data is stored in on the tag. For example, a process is able to read data identifying the creation date if the process is capable of locating the portion of the data containing the creation date and know that that data is the creation date. This reading of data is in contrast to merely obtaining the data from the radio frequency identification tag. The fact that data can be obtained or received does not mean that it can be read.

In the different advantageous embodiments, the computer program code stored on the tag is also sent to the reader and executed on the reader rather than being executed on the tag. By including the software needed to read the data, the different advantageous embodiments avoid the time, expense, and problems associated with agreeing on formats, updating software, having programs to read all of the different possible formats, and other problems associated with data that may be stored in different formats on radio frequency identification tags.

Figure 3:
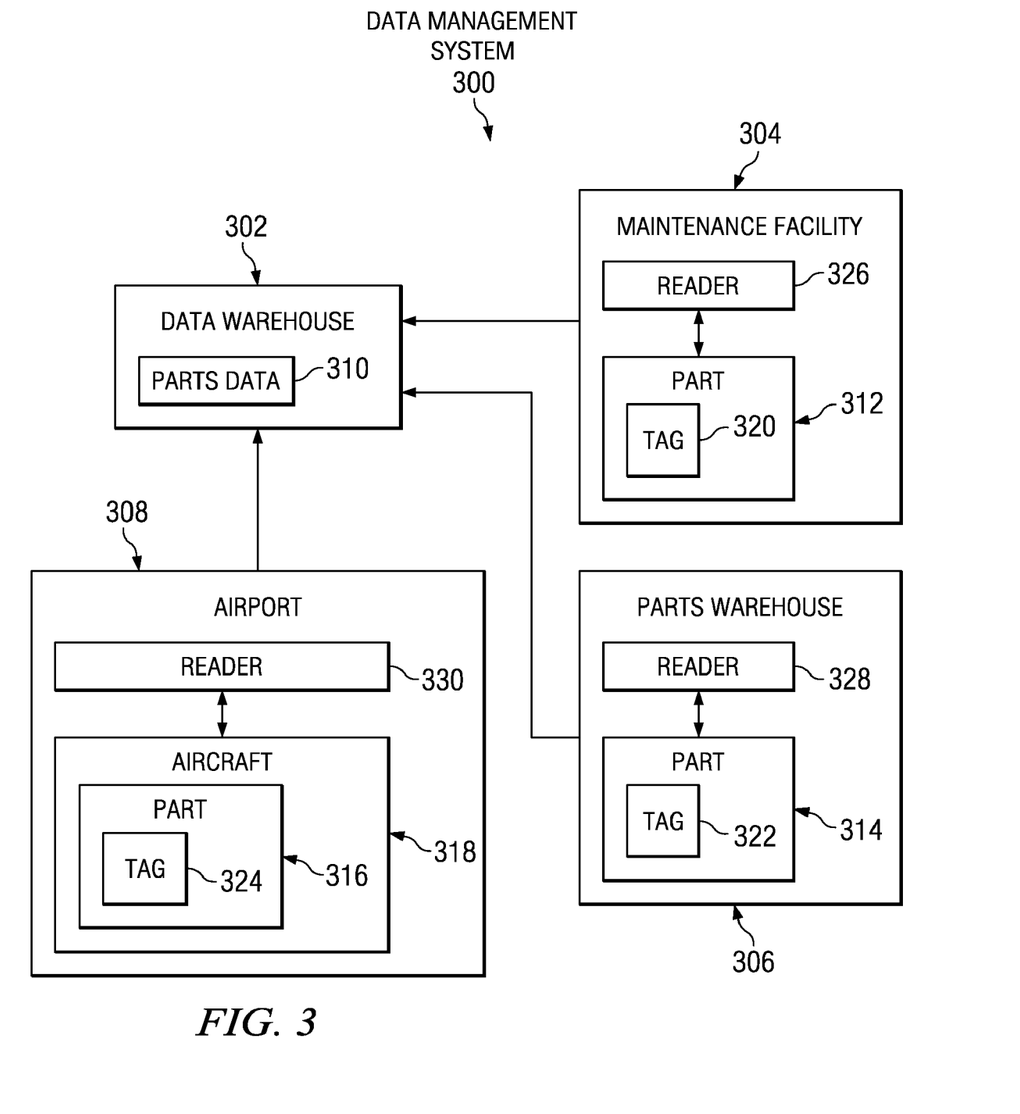
FIG. 3 is a diagram illustrating a data management system in accordance with an advantageous embodiment.

Turning now to FIG. 3, a diagram illustrating a data management system is depicted in accordance with an advantageous embodiment. In this example, data management system 300 is an example of a data management system that may include intermittently connected sensors. In these examples, the intermittently connected sensors may be low powered sensors that may be attached to various items.

As illustrated, data management system 300 includes data warehouse 302, maintenance facility 304, parts warehouse 306, and airport 308. These different locations are examples of some locations at which items in the form of aircraft parts may be stored, maintained, or used. Data warehouse 302 contains parts data 310.

In these examples, parts data 310 contains information about different aircraft parts that may be present in different locations. For example, parts data 310 may include information about part 312 in maintenance facility 304, part 314 in parts warehouse 306, and part 316 in aircraft 318 at airport 308.

Parts data 310 is centrally located at data warehouse 302 in these examples. In other embodiments, parts data 310 may be distributed geographically. For example, parts data 310 may be located at other locations, such as maintenance facility 304, parts warehouse 306, and airport 308.

In these illustrative examples, parts data 310 may be retrieved from intermittently connected sensors, such as radio frequency identification tags. Radio frequency identification tags are also referred to just as tags. In this example, part 312 is associated with tag 320, part 314 is associated with tag 322, and part 316 is associated with tag 324. As depicted, information may be retrieved from tags 320, 322, and 324 using tag readers, such as readers 326, 328, and 330. In the depicted examples, these readers are capable of reading and writing information to radio frequency identification tags. Additionally, these readers also may be able to read information in other formats, such as bar codes and contact sensors. These readers may send information retrieved from these tags to data warehouse 302 for storage in parts data 310.

In this manner, information about various parts that are stored, being maintained, or in use may be analyzed using data warehouse 302. This information also may include maintenance information as well as other suitable information. Other information may include, for example, information as to how long the part is usable, the part identifier, the part number and manufacturer, and other information that may be useful. The retrieved information may be used to identify various trends or statistics about the maintenance needs of various parts, as well as the longevity of these parts.

Additionally, the information identified by readers 326, 328, and 330 may be used locally. For example, in performing maintenance in part 312 at maintenance facility 304, information about the maintenance history of part 312 may be obtained from tag 320. As maintenance is performed, the new maintenance may be recorded into tag 320, in these examples. As another example, reader 330 may obtain information about part 316 used on aircraft 318. Information stored in tag 324 may be modified or updated if operations, such as maintenance operations, are performed on part 316. Further, reader 330 may make the modifications to the information stored on tag 324.

In the different advantageous embodiments, readers 326, 328, and 330 are capable of reading data from tags 320, 322, and 324 without having the software that includes program code to read the data that is stored on these tags. In other words, the data located on tags 320, 322, and 324 may be in different formats, but still readable by these tag readers. The different advantageous embodiments include program code stored on tags 320, 322, and 324 that is executable on readers 326, 328, and 330 to read the information from these tags.

Data management system 300 is presented as one manner in which various advantageous embodiments for managing data on tags can be implemented. This illustrative example is not meant to limit the architecture in which the data management of data on intermittently connected sensors may be implemented. For example, readers and radio frequency identification tags may be located at other types of facilities as illustrated in FIG. 3. Additionally, in other implementations, additional airports, parts warehouses, maintenance facilities, and other suitable locations also may be part of data management system 300.

Figure 4:
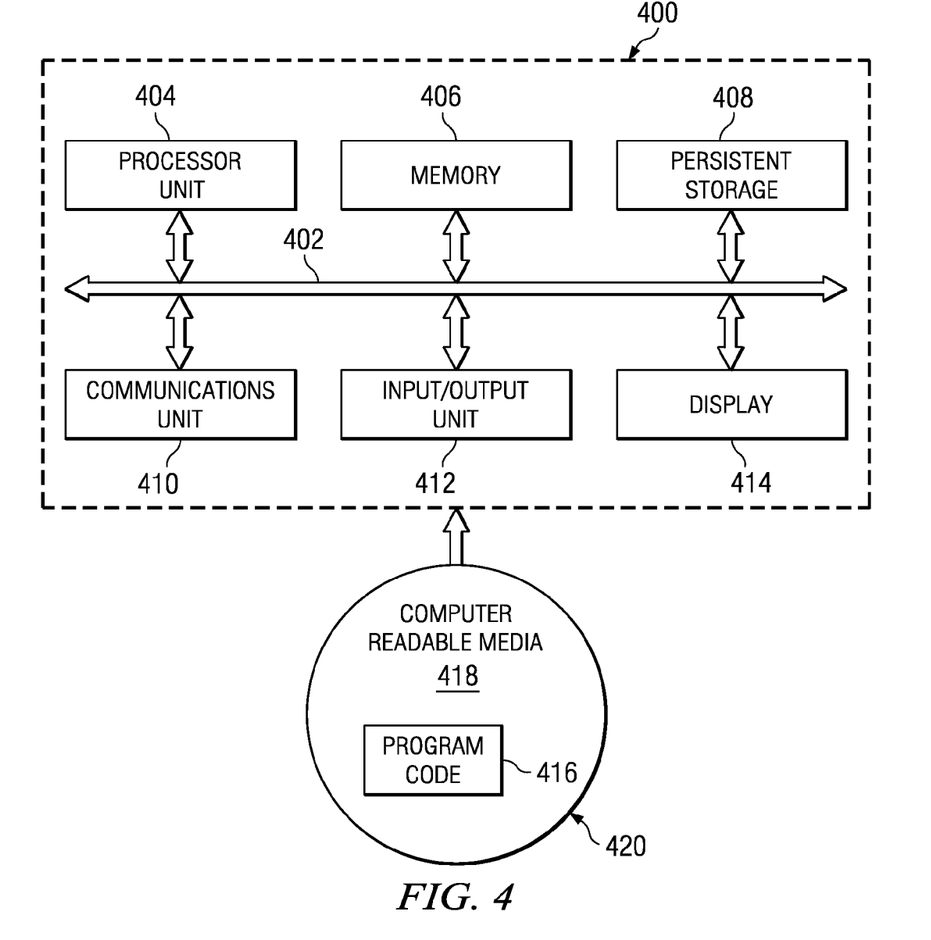
FIG. 4 is a diagram of a data processing system in accordance with an illustrative embodiment.

Turning now to FIG. 4, a diagram of a data processing system is depicted in accordance with an illustrative embodiment. Data processing system 400 may be used to implement various data processing systems within data management system 300 in FIG. 3. For example, data processing system 400 may be used to implement data warehouse 302 in FIG. 3. Further, readers 326, 328 and 330 in FIG. 3 also may be implemented using data processing system 400. In this illustrative example, data processing system 400 includes communications fabric 402, which provides communications between processor unit 404, memory 406, persistent storage 408, communications unit 410, input/output (I/O) unit 412, and display 414.

Processor unit 404 serves to execute instructions for software that may be loaded into memory 406. Processor unit 404 may be a set of one or more processors or may be a multi-processor core, depending on the particular implementation. Further, processor unit 404 may be implemented using one or more heterogeneous processor systems in which a main processor is present with secondary processors on a single chip. As another illustrative example, processor unit 404 may be a symmetric multi-processor system containing multiple processors of the same type.

Memory 406, in these examples, may be, for example, a random access memory or any other suitable volatile or non-volatile storage device. Persistent storage 408 may take various forms depending on the particular implementation. For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard and mouse. Further, input/output unit 412 may send output to a printer. Display 414 provides a mechanism to display information to a user.

Instructions for the operating system and applications or programs are located on persistent storage 408. These instructions may be loaded into memory 406 for execution by processor unit 404. The processes of the different embodiments may be performed by processor unit 404 using computer implemented instructions, which may be located in a memory, such as memory 406. These instructions are referred to as program code, computer usable program code, or computer readable program code that may be read and executed by a processor in processor unit 404. The program code in the different embodiments may be embodied on different physical or tangible computer readable media, such as memory 406 or persistent storage 408.

Program code 416 is located in a functional form on computer readable media 418 that is selectively removable and may be loaded onto or transferred to data processing system 400 for execution by processor unit 404. Program code 416 and computer readable media 418 form computer program product 420 in these examples. In one example, computer readable media 418 may be in a tangible form, such as, for example, an optical or magnetic disc that is inserted or placed into a drive or other device that is part of persistent storage 408 for transfer onto a storage device, such as a hard drive that is part of persistent storage 408.

In the different illustrative examples, computer readable media 418 also may take the form of intermittently connected sensors, such as radio frequency identification tags. In a tangible form, computer readable media 418 also may take the form of a persistent storage, such as a hard drive, a thumb drive, or a flash memory that is connected to data processing system 400. The tangible form of computer readable media 418 is also referred to as computer recordable storage media. In some instances, computer readable media 418 may not be removable.

Alternatively, program code 416 may be transferred to data processing system 400 from computer readable media 418 through a communications link to communications unit 410 and/or through a connection to input/output unit 412. The communications link and/or the connection may be physical or wireless in the illustrative examples. The computer readable media also may take the form of non-tangible media, such as communications links or wireless transmissions containing the program code.

In the different illustrative examples, computer readable media 418 also may take the form of intermittently connected sensors, such as radio frequency identification tags.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown.

As one example, a storage device in data processing system 400 is any hardware apparatus that may store data. Memory 406, persistent storage 408 and computer readable media 418 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406 or a cache such as found in an interface and memory controller hub that may be present in communications fabric 402.

Figure 5:
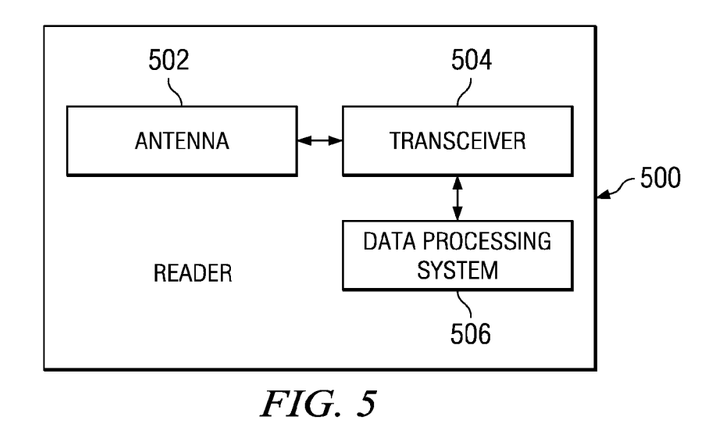
FIG. 5 is a diagram of a reader in accordance with an advantageous embodiment.

Turning now to FIG. 5, a diagram of a reader is depicted in accordance with an advantageous embodiment. In this example, reader 500 includes antenna 502, transceiver 504, and data processing system 506. Reader 500 is a device that is capable of reading and/or writing data to intermittently connected sensors, such as radio frequency identification tags. Reader 500 also may be referred to as a reader data processing system.

Transceiver 504 transmits and receives signals detected by antenna 502. Data processing system 506 controls the transmission and reception of signals. Data processing system 506 may be implemented using a data processing system, such as data processing system 400 in FIG. 4. Further, data processing system 506 also may perform other functions, such as energizing the radio frequency identification tag by causing transceiver 504 to send a signal through antenna 502 to the radio frequency identification tag.

Further, data processing system 506 can demodulate and decode responses received from the radio frequency identification tag. This information may be stored in memory and/or displayed by data processing system 506. Information also may be transferred to another data processing system, such as one for data warehouse 302 in FIG. 3. Additionally, data processing system 506 also may modify data and transmit the modified data back to the radio frequency identification tag. Data processing system 506 may write the modifications to data back into the radio frequency identification tag through a signal generated by transceiver 504 and transmitted by antenna 502. This modification may be changes to data stored on the radio frequency identification tag. In other embodiments, the modifications may be all of the data containing the changes.

Figure 6:
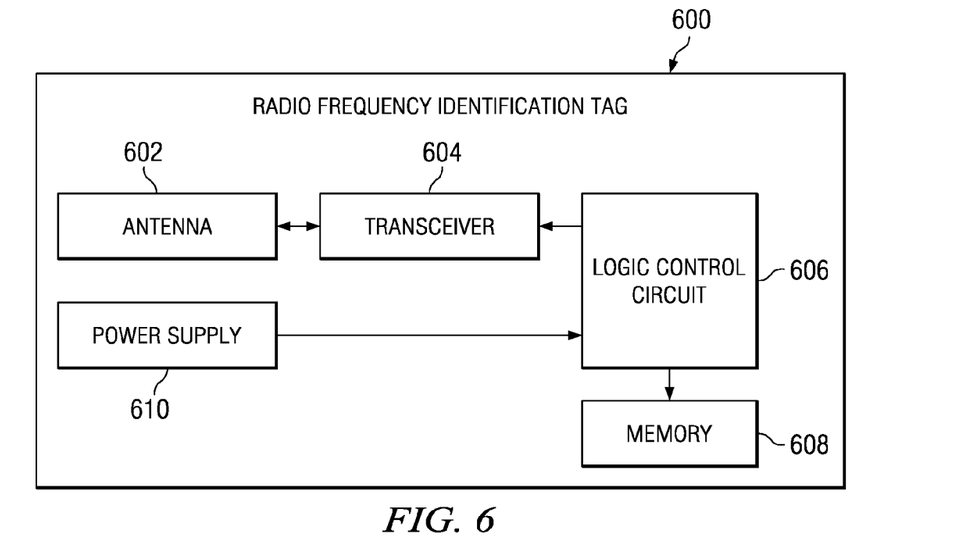
FIG. 6 is a diagram illustrating a radio frequency identification tag in accordance with an advantageous embodiment.

Turning now to FIG. 6, a diagram illustrating a radio frequency identification tag is depicted in accordance with an advantageous embodiment. Radio frequency identification tag 600 is a more detailed example of a tag that may be used to implement radio frequency identification tags, such as tags 320, 322, and 324 in FIG. 3. As depicted in this illustrative example, radio frequency identification tag 600 includes antenna 602, transceiver 604, logic control circuit 606, memory 608, and power supply 610.

Upon detecting radio frequency signals at an appropriate frequency, logic control circuit 606 causes transceiver 604 to transmit a reply through antenna 602 to form a response. Logic control circuit 606 may send information stored in memory 608 to another device, such as a reader, in response to receiving the radio frequency signal. This information may be transmitted in the response signal by modulating the response signal, such that the response signal contains a series of bits in these examples.

Memory 608 is a storage device in radio frequency identification tag 600. This device may store information, such as an identification of a part, creation date, manufacturer, part number, maintenance schedule, maintenance history, and other suitable information.

Power supply 610 increases the range at which radio frequency identification tag 600 may transmit information. In this example, radio frequency identification tag 600 is an active non-linear tag. If radio frequency identification tag 600 takes the form of a semi-active non-linear tag, power supply 610 is not used to transmit signals.

The different embodiments may be applied to any type of radio frequency identification tag. For example, different embodiments may be implemented using passive radio frequency identification tags, active radio frequency identification tags, semi-passive radio frequency identification tags, and any other suitable type of radio frequency identification tag.

Figure 7:
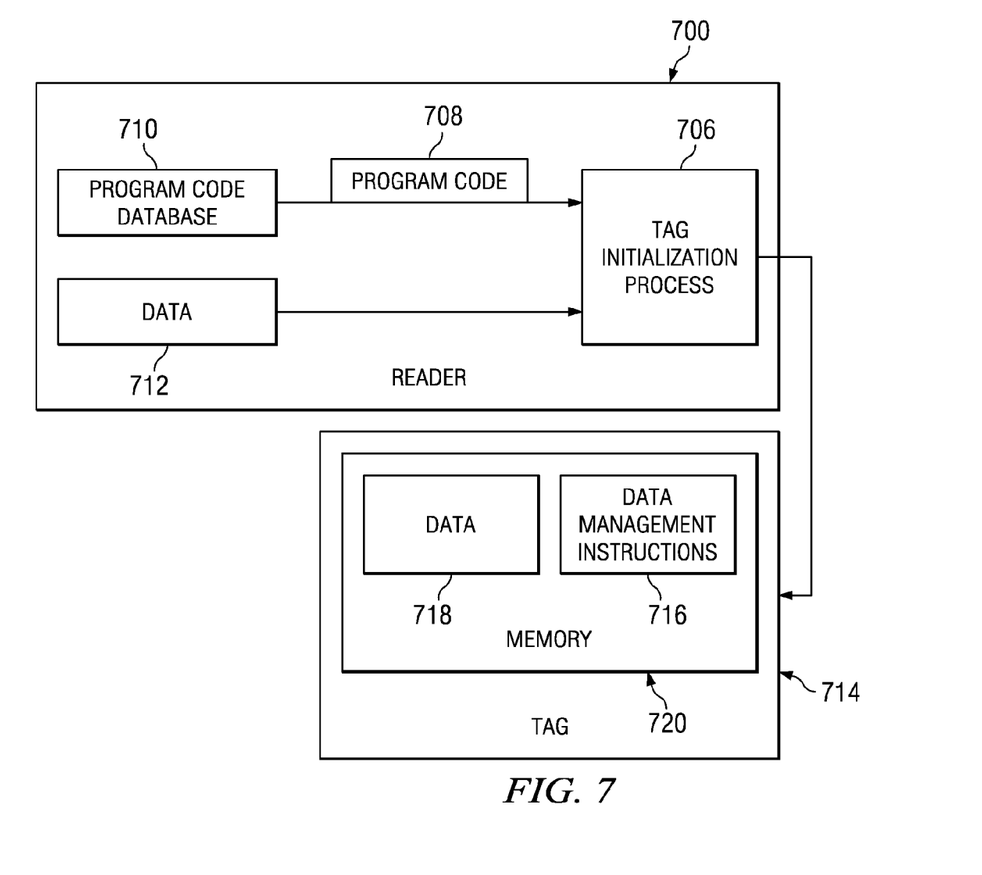
FIG. 7 is a diagram of components used to initialize a radio frequency identification tag in accordance with an advantageous embodiment.

Turning now to FIG. 7, a diagram of components used to initialize a radio frequency identification tag is depicted in accordance with an advantageous embodiment. Reader 700 may be implemented using a reader, such as reader 500 in FIG. 5.

In this example, reader 700 includes tag initialization process 706. Tag initialization process 706 may select program code 708 from program code database 710 for use in reading data 712. Program code 708 may take different forms, depending on the particular implementation. For example, program code 708 may be a process, a method, an application, an applet, or some other program code that can be executed by a reader. Data 712 is data for an item to which tag 714 is to be associated. Once the particular format or loading method for reading data is selected, program code 708 for that particular method is retrieved from program code database 710.

Program code 708 is capable of properly reading data 712 in these examples. The loading method is a mechanism used to transmit or load information. For example, the loading method may require encryption of the information in which keys are used to decrypt the information. Another example of a loading method is the use of archive files, such as a Java archive (jar) file. A method is used to call the code in the archive to begin execution.

Tag initialization process 706 writes program code database 710 and data 712 into the tag 714 as data management instructions 716 and data 718 into memory 720. Program code 710 and data 712 are examples of information. Data 718 is a copy of data 712. Data management instructions 716 may be a copy or form of program code 708.

In some embodiments, tag initialization process 706 may modify or transform program code 708 to form data management instructions 716. This modification may include, for example, encrypting program code 708, converting program code 708 into another format, and/or compressing program code 708.

Figure 8:
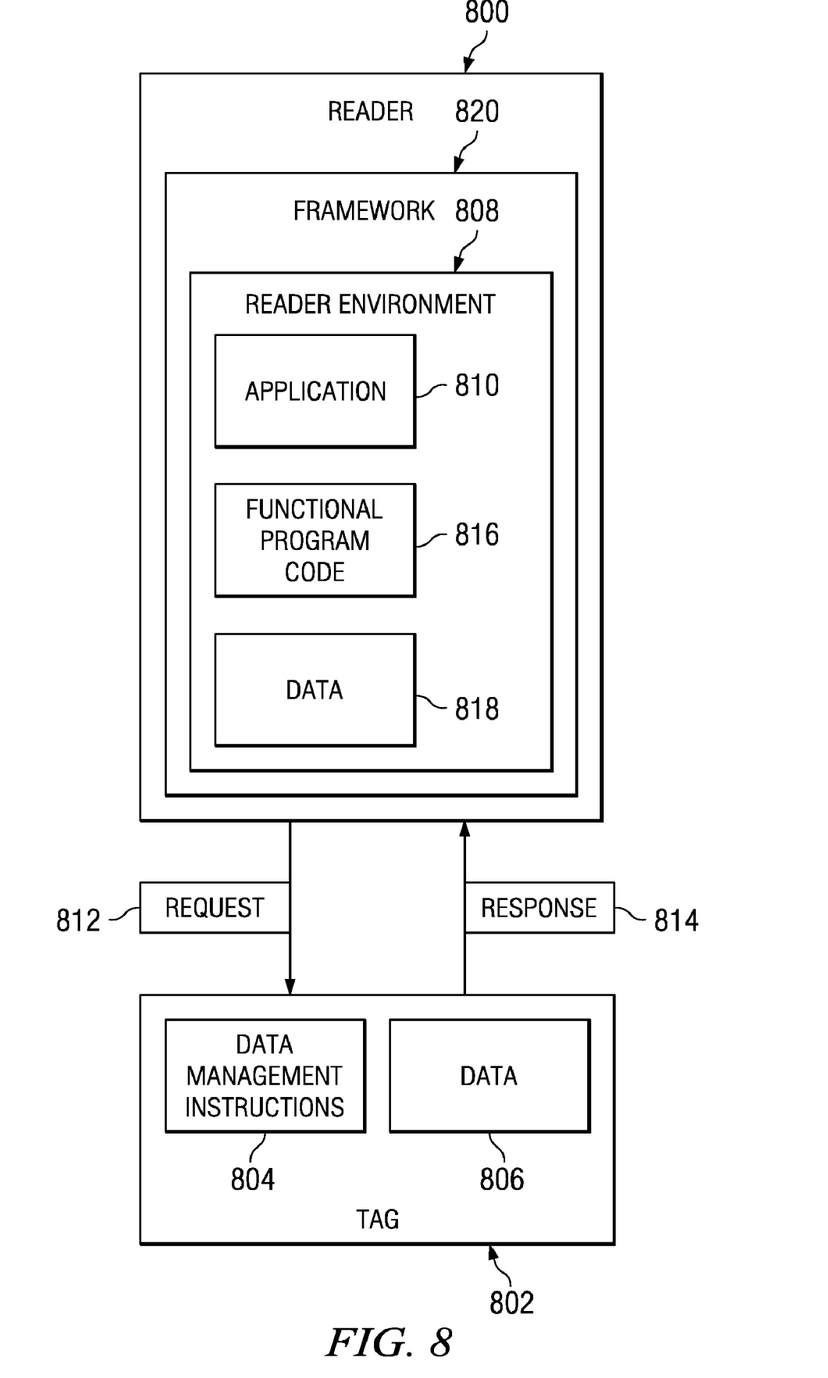
FIG. 8 is a diagram illustrating components used to manage data in tags in accordance with an advantageous embodiment.

Turning now to FIG. 8, a diagram illustrating components used to manage data in tags is depicted in accordance with an advantageous embodiment. In this example, reader 800 may be used with tag 802 to manage information about an item associated with tag 802, such as an aircraft part.

In these examples, reader 800 may be implemented using reader 500 in FIG. 5. Tag 802 may be implemented using radio frequency identification tag 600 in FIG. 6. In these examples, tag 802 includes data management instructions 804 and data 806. This information may be stored in a storage device, such as memory 608 in FIG. 6.

In the different advantageous embodiments, code, such as data management instructions 804, for reading data, such as data 806, is stored in tag 802. These instructions are not executed within tag 802. Instead, data management instructions 804 are executed by reader 800. In this manner, protocols, methods, processes, schemas, and/or other suitable information about processing data may be stored in tag 802 as data management instructions 804 for use in reading and using data 806.

In these examples, data management instructions 804 contain the program code needed to read data 806. In other words, data management instructions 804 may be executed to read data 806. Reading data 806 means the fields and the types of fields in data 806 can be located and used. Data management instructions 804 may be, for example, a process, program, applet, or some other program code that may be used within reader environment 808 to read and use data 806.

Reader environment 808 may take various forms. For example, this environment may be an environment such as Java™, .Net, Perl, and Ruby. Of course, other types of environments may be used to implement reader environment 808 in these examples. Reader environment 808 includes application 810, which may be used to process and use data 806.

In these examples, reader 800 may send request 812 to tag 802. In response, tag 802 provides response 814. In these advantageous embodiments, if request 812 is to obtain data 806, response 814 includes data management instructions 804 and data 806. When reader 800 receives response 814, data management instructions 804 and data 806 are processed by application 810 to form functional program code 816 and data 818. Data 818 is a copy of data 806 as provided in response 814. Functional program code 816 is a form of data management instructions 804 that may be executed within reader environment 808. In particular, functional program code 816 may be used by application 810 to read and understand data 818.

Changes or modifications to data 818 may be returned and stored in tag 802 using another form of request 812. In response to modifying data 806, response 814 is returned to indicate a success or failure of the operation. The different advantageous embodiments recognize that different data management instructions may require different environments. Framework 820 is capable of identifying an appropriate environment needed to load and process data management instructions 804.

Depending on the particular implementation, data management instructions 804 may be encrypted, compressed, or in some other non-functional format. In these types of embodiments, data management instructions 804 is converted into a functional form to form functional program code 816. In some embodiments, data management instructions 804 may already be in a functional form. The data may be encrypted or compressed in addition to the encryption/compression of the data management instructions.

As a result, reader 800 does not need an application or code that is specifically designed to read data 806. Instead, the program code needed to read data 806 is obtained from tag 802. The program code stored on tag 802 may be in a non-function form and is referred to as data management instructions 804. These instructions may be converted into functional program code 816 for execution in reader environment 808. This type of configuration allows reader 800 to read data in any format without requiring specific software for that format. In these examples, only reader environment 808 needs to recognize how to execute or run functional program code 816 when loaded into reader environment 808.

In other words, the different advantageous embodiments provide an automatic identification method for managing data in memory of a radio frequency identification tag such that data can be retrieved at a later time. In these examples, reader 800 is designed to obtain or retrieve information from tag 802 through some selected frequency or range of frequencies. In other advantageous embodiments, functional program code 816 may be a stand alone program or environment executed by reader 800.

Figure 9:
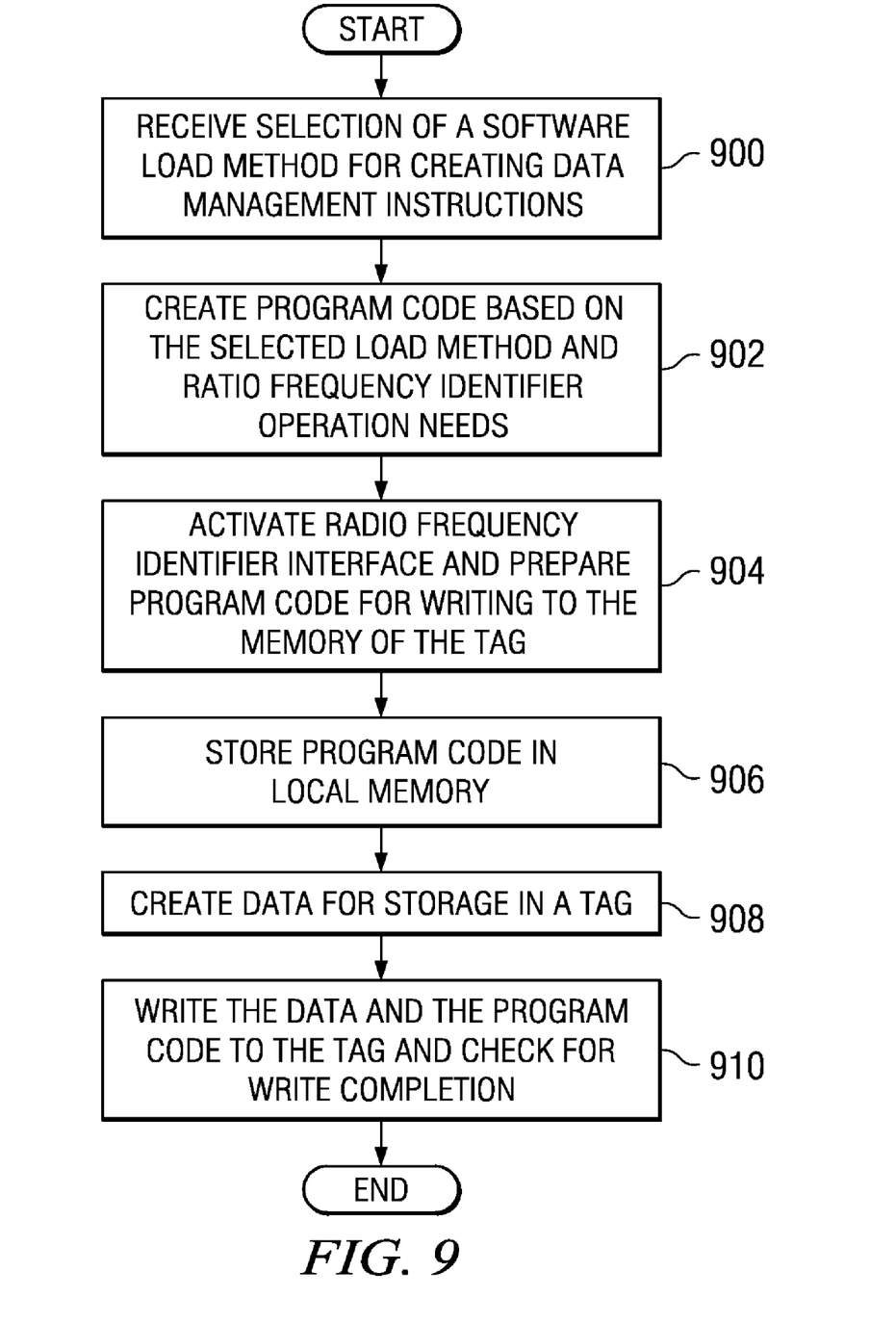
FIG. 9 is a flowchart for initializing a radio frequency identification tag in accordance with an advantageous embodiment.

Turning now to FIG. 9, a flowchart for initializing a radio frequency identification tag is depicted in accordance with an advantageous embodiment. The process illustrated in FIG. 9 may be implemented using a data processing system, such as data processing system 400 in FIG. 4. In particular, the process illustrated in FIG. 9 may be implemented in a process, such as tag initialization process 706 in FIG. 7.

The process begins by receiving a selection of a software load method for creating data management instructions (operation 900). In these examples, Java Reflection is an example of a load method that may be used. Java Reflection is a feature in the Java™ programming language that allows an executing Java™ program to examine or "introspect" upon itself and manipulate internal properties of the program.

The process then creates the program code based on the selected load method and the radio frequency identifier operation needs (operation 902). In these examples, operation 902 may be formed by selecting the appropriate program code.

In other embodiments, the creation of the program code may involve actually providing the program code needed for a particular format used for the data. Generally, the program code contains code needed to identify the data on a tag, such as extensible markup language structures or fields used to organize the data. The program code also may be created to read the manufacture date and the expiration date of an aircraft part, such as a life vest.

In creating the program code, only code needed for these functions are used in operation 902 for this type of implementation. Another example is a load method that encrypts proprietary data. In this implementation, code for handling or identifying the data, the fields, and code for encrypting and decrypting the data is included in the program code.

The process then activates the radio frequency identifier interface and prepares the program code for writing to the memory of the tag (operation 904). In operation 904, the radio frequency identifier interface is the interface used to communicate with a tag. Preparing the program code may include, for example, changing the format of the program code, encrypting the program code, and/or compressing the program code.

The process stores the program code in local memory (operation 906). This local memory is the memory in the reader, in these examples. The process creates data for storage in a tag (operation 908). This information may be, for example, a creation date or birth record for an aircraft part. The data also may be a data structure for use in storing information about the aircraft part. Thereafter, the process writes the data and the data program code to the tag and checks for write completion (operation 910), with the process terminating thereafter. The program code for the tag is referred to as data management instructions.

Figure 10:
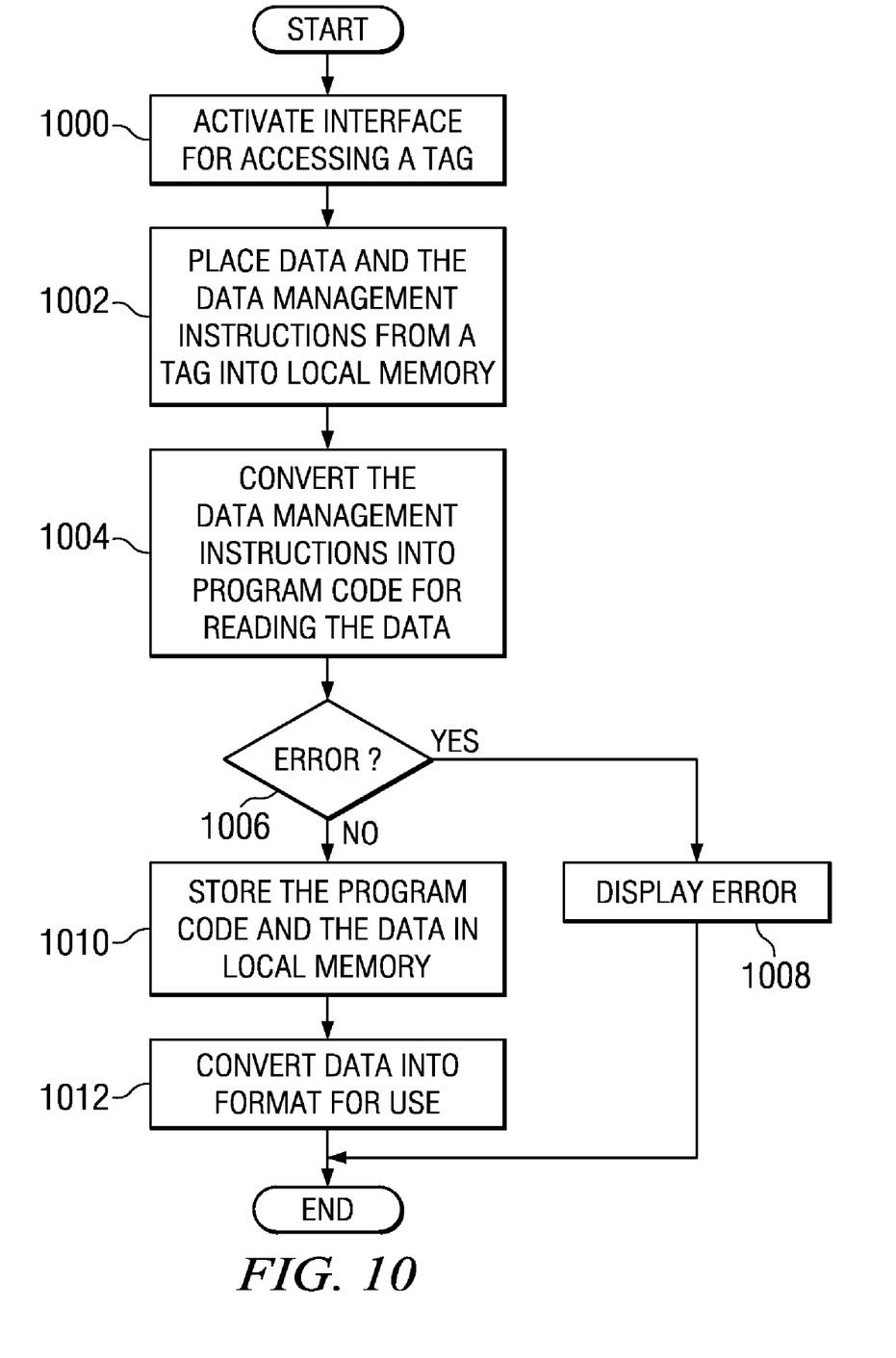
FIG. 10 is a flowchart of a process for reading information from a tag in accordance with an advantageous embodiment.

Turning now to FIG. 10, a flowchart of a process for reading information from a tag is depicted in accordance with an advantageous embodiment. In these examples, the process illustrated in FIG. 10 may be executed in a reader, such as reader 800 in FIG. 8. In particular, the process may be executed using application 810 in FIG. 8.

The process begins by activating the interface for accessing a tag (operation 1000). Next, the process places the data and the data management instructions from a tag to local memory in the reader (operation 1002). The process then converts the data management instructions into program code for reading the data (operation 1004). This conversion is an optional step performed only when data management instructions are in a non-functional form. The conversion of data management instructions into program code, which is in a functional form, may include various processes. For example, the data management instructions may be unencrypted, uncompressed, and/or changed in format.

Next, a determination is made as whether an error has occurred in converting the program code or an error is present in the data (operation 1006). If an error is present, the error is displayed (operation 1008), with the process terminating thereafter. The display of the error may be, for example, an error code or some other indication that an error has occurred in converting the data management instructions and/or reading the data.

With reference again to operation 1006, if an error is not present, the program code and the data are stored in the local memory of the reader (operation 1010). Thereafter, the process converts the data into a format for use (operation 1012), with the process terminating thereafter. In operation 1012, the conversion of the data into a format for use may include, for example, creating fields for data objects from the data using the program code generated from the data management instructions using the program code.

Figure 11:
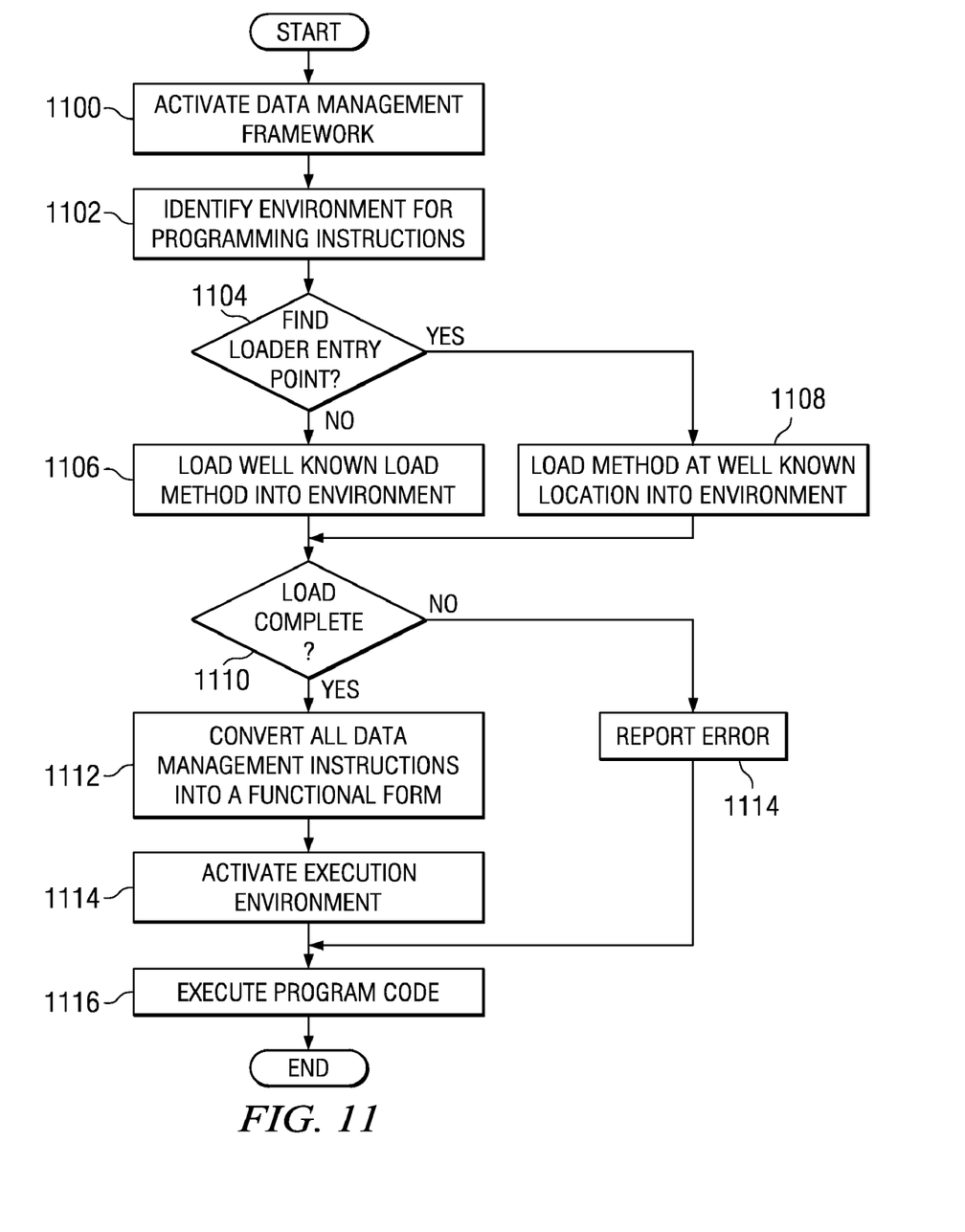
FIG. 11 is a flowchart of a process for converting data management instructions into program code in accordance with an advantageous embodiment.

With reference now to FIG. 11, a flowchart of a process for converting data management instructions into program code is depicted in accordance with an advantageous embodiment. The process illustrated in FIG. 11 is a more detailed illustration of operation 1004 in FIG. 10.

The process begins by activating the data management framework (operation 1100). The data management framework may be, for example, framework 820 in FIG. 8. This framework is a process that runs in the reader that is able to initialize and execute various environments. The process then identifies the execution environment for the programming instructions (operation 1102). The environment is identified using the data management framework.

A determination is made as to whether a loader entry point can be found (operation 1104). The loader entry point may be identified from data located within the tag. If the loader entry point not found, then a well known method is present. In these examples, the well known method is a method named or name of a process that is commonly used or known. The well known method may be one that is specified through protocol, agreement, and/or a standard.

The process then loads the well known method into the execution environment and executes the load method (operation 1106). On the other hand, if an entry point is found, the process loads a method at the location of the entry point into the execution environment (operation 1108).

After operation 1106 or operation 1108 occurs, a determination is made as to whether the loading has completed (operation 1110). Operation 1110 is used to determine whether all of the program code for the data management instructions has been loaded. If the load is complete, the process converts the data management instructions into a functional form (operation 1112).

Next, the process activates the execution environment (operation 1114) and executes the program code (operation 1116), with the process terminating thereafter. At this point, other processes may use the program code to process the data from the tag with the process terminating thereafter.

With reference again to operation 1110, if the loading did not complete, an error is reported (operation 1116), with the process terminating thereafter. The loading may not complete or occur for different reasons. For example, the data on the tag may be corrupt. In other examples, the data may have been damaged or tampering may have occurred.

Figure 12:
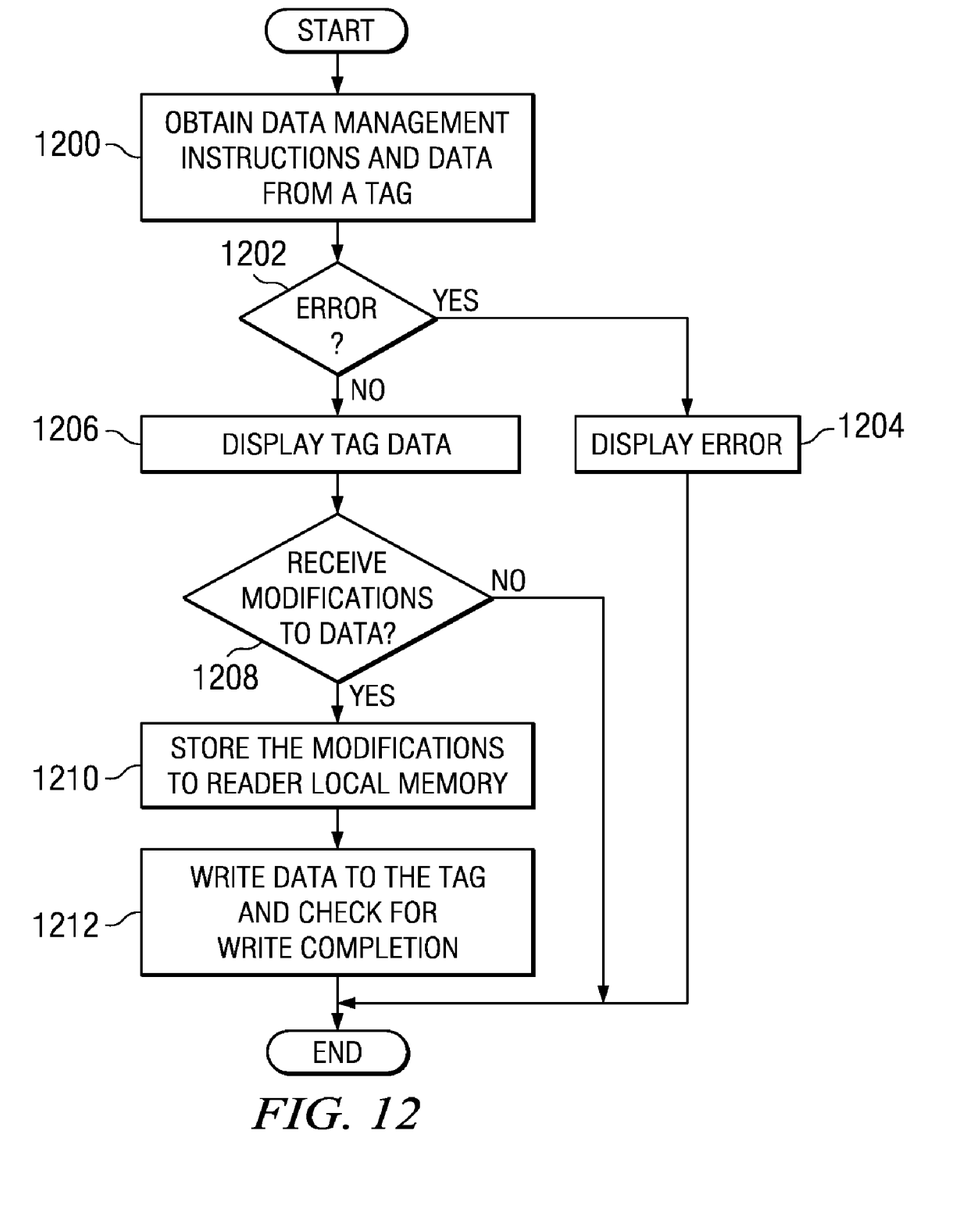
FIG. 12 is a flowchart of a process for updating data in a tag in accordance with an advantageous embodiment.

With reference now to FIG. 12, a flowchart of a process for updating data in a tag is depicted in accordance with an advantageous embodiment. The process illustrated in FIG. 12 may be implemented using a reader, such as reader 800 in FIG. 8. More specifically, the process illustrated in these figures may be executed by a software process, such as application 810 in FIG. 8.

The process begins by obtaining data management instructions and data from a tag (operation 1200). Operations 1000-1004 in FIG. 10 are a more detailed description of operation 1200 in FIG. 12. A determination is made as to whether an error has occurred in reading the data management instructions and the data (operation 1202). If an error has occurred, the error is displayed (operation 1204) and the process terminates. Otherwise, the tag data is displayed (operation 1206).

A determination is then made as to whether modifications have been received for the tag data (operation 1208). These modifications may be, for example, updates to a maintenance history or schedule after a maintenance procedure has been performed on the associated aircraft part. For example, the modification may be an addition of an entry into the maintenance history identifying the maintenance that has been performed on the part. The modification also may be, for example, a new or updated maintenance schedule for the part.

Additionally, these modifications may be, for example, modifications to the data based on some procedure or process performed on the associated aircraft part. For example, the modification may be an addition of an entry into the maintenance history identifying the maintenance that has been performed on the part. The modification also may be, for example, a new or updated maintenance schedule for the part.

If modifications have been received for the data, the modifications are stored in the local memory of the reader (operation 1210). Thereafter, the process writes data to the tag and checks for write completions (operation 1212), with the process terminating thereafter. With reference again to operation 1208, if modifications are not received for the data, the process terminates. Also, modifications to the data management instructions also may occur.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the different advantageous embodiments provide a computer implemented method, apparatus, and computer program code for managing data in intermittently connected sensors. In the different advantageous embodiments, data management instructions may be created for storage in an intermittently connected sensor, such as a radio frequency identification tag. These data management instructions may then be later read by a reader along with the data in the tag to interpret or read the data. The data management instructions may be executed by the reader environment to read and present data. In this manner, any reader may be used as long as the data management instructions are executable from the reader.

A particular identification of the structure, protocol, schema, and/or other information needed to read the data is not needed at the reader application. Instead the data management instructions are executed to properly interpret or present the data. With this type of method and apparatus, requiring uniformity of software in different readers or multiple versions of software to read data are no longer needed. Further, an inability to read data because an updated application from reading a particular format of the data has not yet been received also is avoided.

The description of the different advantageous embodiments has been presented for purposes of illustration and description, and is not intended to be exhaustive or limited to the embodiments in the form disclosed. Many modifications and variations will be apparent to those of ordinary skill in the art. For example, although the different depicted embodiments are directed towards data for aircraft parts, the different advantageous embodiments may be used to manage data for other items associated with intermittently connected sensors. For example, the different embodiments may be used with parts for ships, submarines, land vehicles, or spacecraft.

Also, other types of intermittently connected sensors can be used, such as, for example, without limitation, a memory spot chip or a contact memory button. A memory spot chip is available from Hewlett-Packard Co. A contact memory button is available from Coalescent Technologies Corporation. As another example, the different embodiments may use transponders, such those used for toll roads. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A data management system for managing data on radio frequency identification tags, the data management system comprising:
   a radio frequency identification tag configured to store and send the data and instructions in a memory of the radio frequency identification tag, wherein the data is stored and sent in two or more different formats:
   and a reader data processing system in a reader, wherein the reader data processing system is configured, to receive, in a radio frequency signal, the data in the two or more different formats, to receive the instructions, and to store the data and the instructions in a memory of the reader wherein the reader data processing system converts the instructions into program code configured for execution by the reader data processing system, to read the data in each of the two or more formats using the information.

2. The data management system of claim 1, wherein the program code is stored on the radio frequency identification tag in a non-functional form and wherein the reader data processing system executes the program code by converting the program code into a functional form and executing the program code in the functional form.

3. The data management system of claim 2, wherein the program code in the non-functional form comprises one of encrypted instructions and compressed instructions.

4. The data management system of claim 1, wherein the reader data processing system stores modifications to the data in the radio frequency identification tag.

5. The data management system of claim 4, wherein the reader data processing system stores the modifications to the data in the radio frequency identification tag by storing the data with the modifications to the radio frequency identification tag.

6. The data management system of claim 4, wherein the reader data processing system stores the modifications to the data in the radio frequency identification tag by modifying the data stored in the radio frequency identification tag with the modifications.

7. The data management system of claim 1, wherein the data comprises at least a portion of a maintenance history for an aircraft part.

8. The data management system of claim 1, wherein the program code comprises at least one method that causes the reader data processing system to interpret a format of the data when the program code is executed by the reader data processing system.

9. The data management system of claim 1, wherein the information comprises a number of fields and a number of types for the data.

10. A system comprising:
    a housing for a radio frequency identification device;
    an antenna located within the housing;
    a memory located in the housing and storing data in two or more formats and data management instructions;
    a logic control circuit of the radio frequency identification device located within the housing configured, in response to detecting a signal, to cause the antenna to emit a response signal containing the data and the data management instructions; and
    a reader data processing system, wherein the reader data processing system is configured to send the signal and to receive the response signal and execute the data management instructions in the response signal to convert the data management instructions into program code configured for execution by the data processing system to read the data in each of the two or more formats.

11. The system of claim 10, wherein the signal also contains the data.

12. The system of claim 11, wherein the reader data processing system received the data in a second signal transmitted by the logic control circuit.

13. The system of claim 10, wherein the data management instructions are in a non-functional form and wherein the reader data processing system converts the data management instructions into a functional form as program code and executes the program code to execute the data management instructions.

14. A computer implemented method for managing data in two or more formats on an intermittently connected radio frequency identification tag sense, the computer implemented method comprising:
    receiving the data and data management instructions from the intermittently connected radio frequency identification tag at a data processing system of a reader device;
    executing the data management instructions on the data processing system to generate program code configured to convert the data management instructions into program code configured for execution by the data processing system to read the data in each of the two or more formats; and
    reading the data using the information.

15. The computer implemented method of claim 14, wherein the executing step comprises:
    converting the data management instructions into a functional form to form program code; and
    executing the program code to read the data.

16. The computer implemented method of claim 15, wherein the data management instructions are the program code in one of a compressed form and an encrypted form.

17. The computer implemented method of claim 15, wherein the functional form is the program code in a form selected from one of a computer program, a method, and an applet.

18. The computer implemented method of claim 14, wherein the receiving step comprises:
    receiving the data and the data management instructions from the intermittently connected radio frequency identification tag at the data processing system to form a received image; and
    performing error checking on the received image.

19. The computer implemented method of claim 14 further comprising:
    creating modifications to the data received from the intermittently connected sensor; and
    saving the modifications to the data in the intermittently connected sensor.

* * * * *